United States Patent Office 3,528,818
Patented Sept. 15, 1970

3,528,818
WATER ABSORPTIVE PROTEIN
Leon Tumerman, Deerfield, and Jules H. Guth, Mount Prospect, Ill., and Robert A. Hollis, Highland Park, N.J., assignors to Kraftco Corporation, New York, N.Y., a corporation of Delaware
Filed May 18, 1967, Ser. No. 639,563
Int. Cl. A23c 9/00
U.S. Cl. 99—56                                4 Claims

ABSTRACT OF THE DISCLOSURE

A method of treating protein to increase the water absorptive capacity thereof. In a preferred method for treating protein in skim milk powder having from 3.5 to 16 weight percent of moisture, the skim milk powder is heat treated at temperatures of from 125° F. to 270° F. for time periods of from 60 to 0.6 minutes respectively. The water absorptive capacity of the protein may be further enhanced by thereafter extracting soluble solids from the heat treated protein by aqueous extraction.

---

The present invention relates generally to improved milk products, and more particularly to a method for improving the water absorptive capacity of spray dried skim milk powder and to the product resulting therefrom.

Water absorption capacity as used herein is defined as the ability of a material to take up or bind water and to hold such water immobilized in a food product to prevent any substantial separation of water during processing and storage of the food product.

Skim milk powder is often used in food products when it is desirable to bind or immobilize water, such as in bread or other baked goods, meat loaves, sausages, wieners or the like. Skim milk powder is usually made by spray drying because of the heat sensitive nature of skim milk solids and it accordingly has a better flavor than skim milk powder made by other methods.

However, spray dried skim milk powder is deficient in water absorptive capacity. It has long been a goal in the art to increase the water absorptive capacity of spray dried skim milk powder and other dry milk powders which are deficient in water absorptive capacity.

Accordingly, it is an object of the present invention to provide a dry milk powder with improved water absorption characteristics. It is another object of the present invention to provide a process for treating spray dried skim milk powder which provides improved water absorption characteristics.

These and other objects of the present invention will become more clear from the following detailed description and the accompanying drawings wherein.

Generally, in a process embodying certain features of the present invention dried milk powders having improved water absorption capacity are produced by heating milk powder having pre-selected levels of moisture to predetermined temperatures for predetermined periods of time. While the process of the present invention is described with particular reference to skim milk powder it will be readily apparent to one skilled in the art that the process is equally suitable for other milk powders, such as those with other fat levels.

In particular, the water absorption capacity of spray dried skim milk powder may be increased by heating spray dried skim milk powder having a moisture level of from about 3 percent to about 30 percent at time-temperature conditions related to these moisture levels. The time-temperature conditions relate to the temperature of the skim milk powder and not to the ambient heating conditions. In this connection heating of the skim milk powder to the desired temperature for the desired time may be effected by any suitable method.

One suitable method for producing the required time-temperature conditions is to contact skim milk powder with a hot gas, preferably heated air, for a predetermined period of time. The temperature of the skim milk powder is related to the temperature of the hot air and the time of contact and may readily be determined by one skilled in the art. While contacting the skim milk powder with heated air it is preferred to maintain the powder in a fluidized condition to improve heat transfer between the heated air and the powder.

Another method for effecting heat treatment, particularly suitable for powders of relatively low moisture, is to add the skim milk powder to a heated organic fluid which boils at the desired temperature and to maintain the skim milk powder in the organic fluid mixture under reflux conditions for the desired period of time.

As stated above, the method of the present invention increases the water absorptive capacity of milk powders containing milk fat as well as non-fat milk solids. However, milk fat is not generally desirable in products in which water absorptive capacity is desirable.

Figure 3:
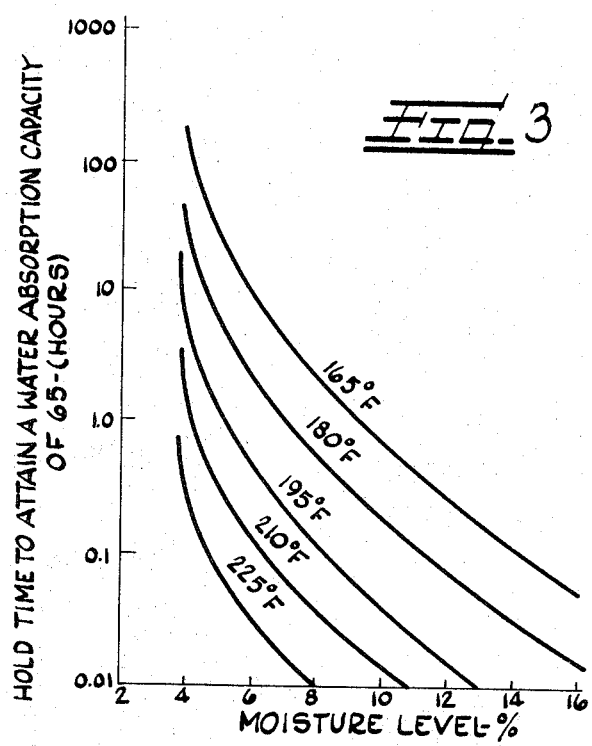
FIG. 3 is a plot relating to the time required to reach a certain level of water absorption capacity to the moisture of the treated material at various treatment temperatures.
Figure 4:
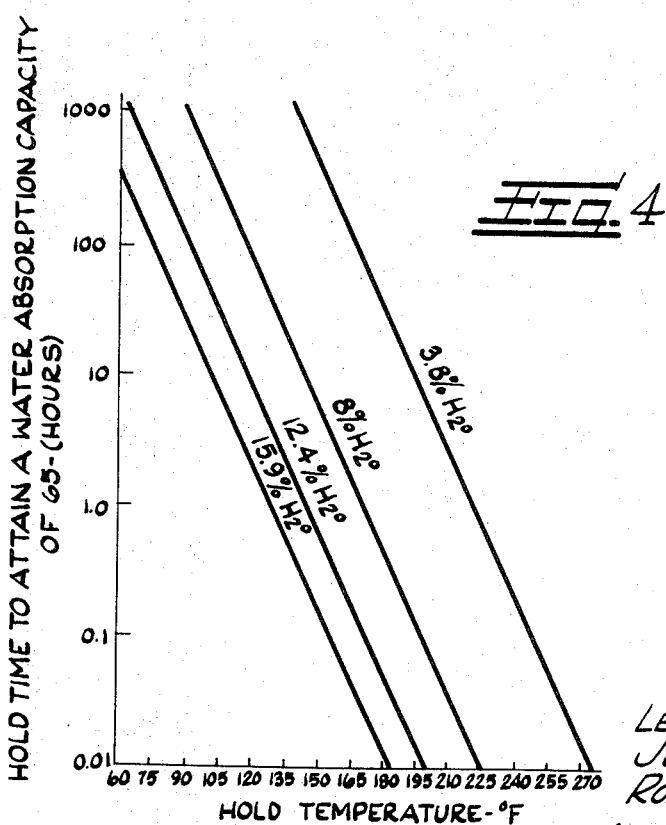
FIG. 4 is a plot relating to the time required to reach a certain level of water absorption capacity to the temperature of treatment of the material at various moisture levels.

The temperature and duration of the heat treatment employed to attain the desired increase in the water absorptive capacity is related to the moisture content of the non-fat dried milk at the time of heat treatment. With increasing moisture level in the powder under treatment, the temperature and/or hold time required to attain a fixed increment in water absorptive capacity in the milk powder decreases in a substantially predictable relationship as shown in FIGS. 3 and 4. As can be seen in FIG. 4, a skim milk powder with 3.8 percent by weight moisture requires an instantaneous temperature of approximately 270° F. to increase its water absorption capacity to 65 percent (determined by the Farinograph method as will be explained more fully hereinafter). The same level of water absorption capacity can be obtained by an instantaneous heat treatment of 225° F. when the moisture level of the skim milk powder is 8 percent by weight. Equivalent improvements in milk powder water absorption capacity are obtained at progressively lower instantaneous temperatures with further increases in the moisture level of the powder, up to a level of about 30 percent by weight moisture as will be explained more fully hereinafter.

While not wishing to be bound by any theory, it is believed that the increase in water absorptive capacity of milk powder treated in accordance with the present invention is the result of two reactions, possibly occurring simultaneously. One is a destabilization process which tends to insolubilize certain protein of milk powder to form a sponge-like protein structure. The other reaction is provided by a further effect of heat on the insolubilized protein. The insolubilizing of the protein may be likened to the creation of a sponge network. An insoluble spongy structure is required since it is readily apparent that it would be impossible for a sponge to absorb water if the sponge is also soluble. It is believed that the further effect of heat on the insolubilized protein serves to improve the characteristics of the protein sponge network. In addition, there may be some interaction between the protein and non-protein components of the milk powder during the heat treatment of the present invention.

As heretofore stated, water absorptive capacity of milk powders may be increased by heat treatment in accordance with the present invention at milk powder moisture levels of up to about 30 percent by weight. However, at moisture levels above about 20 percent the milk powder tends to form sticky doughs which are difficult to handle. In this connection, it is desirable to store milk powders which have been treated in accordance with the present invention in a substantially dry state. When heat treatment is effected on milk powders with higher moisture levels, above about 16 percent, the costs of drying the milk powder after treatment are substantially increased. It is therefore preferred to treat milk powders having less than about 16 percent moisture.

Furthermore, as can be seen in FIG. 3, at moisture level below about 3.5 percent the time required to effect a desired increase in water absorption capacity is substantially increased. It is therefore preferred to treat milk powders having more than about 3.5 percent moisture.

Commercial spray dried skim milk powder is readily available with a moisture level of about 4 percent. Other desired moisture levels may be obtained by any suitable method. One suitable method is to rehydrate spray dried skim milk powder with moist air or steam to the desired moisture level.

In accordance with the process of the present invention, the water absorptive capacity of milk powders may be increased to provide dry milk powders with desirably high water absorptive capacity. The extent to which the water absorptive capacity is increased may be controlled by varying the time-temperature relationship and the moisture level during heat treatment of the skim milk powder.

Water absorptive capacity may be further enhanced by extraction of the soluble solids with water from milk powder treated by the present invention. This removes soluble material from the sponge-like protein structure and increases the relative water absorptive capacity of the protein. The soluble solids, primarily lactose, may be recovered as a by-product.

The following examples further illustrate various features of the present invention but are intended to in no way limit the scope of the invention which is defined in the appended claims.

EXAMPLE I

Samples from the same lot of spray dried skim milk having a moisture level of 3.8 percent by weight were heat treated by immersing the samples in boiling organic solvent. Xylene, toluene, and 2,2,4-trimethylpentane and mixtures thereof were used to provide reflux boiling temperatures of from 221° F. to 248° F. The powder was added to the boiling solvent under conditions of agitation and was allowed to remain at the reflux temperature for various periods of time. Samples 1 through 4 were treated in the above manner and the water absorption capacity after the heat treatment was determined. The results are presented below in Table 1 and compared with control sample 5 which was spray dried skim milk powder that was not heat treated in accordance with the present invention.

The water absorption capacity was determined by the Farinograph method. One hundred and fifty grams of flour with a known water absorption capacity was dry mixed with 150 grams of the skim milk powder to be tested in the Farinograph mixing chamber. Water was then introduced into the mixing chamber until a dough was formed. Water was then added incrementally to the mixing chamber while the viscosity of the dough was measured. The total amount of water in the grams that could be absorbed by the dough system prior to a sharp decrease in viscosity is a relative measure of the water absorption capacity of the dough system. The amount of water that could be absorbed by the known weight of skim milk powder can then be determined from the known contribution of the flour. The weight of water that can be absorbed by 100 grams of the skim milk powder is the Farinograph water absorption capacity as reported below in the following table:

TABLE 1

| Sample No. | Organic solvent | Volume, percent | Temperature of solvent | Time (min.) | Farinograph water absorptive capacity, gms. water absorbed by 100 gms. skim milk powder |
|---|---|---|---|---|---|
| 1 | 2,2,4 trimethylpentane | 50 | 221 | 60 | 52 |
|   | Toluene | 50 |   |   |   |
| 2 | Toluene | 100 | 230 | 25 | 61 |
| 3 | Xylene | 18 | 239 | 24 | 76 |
|   | Toluene | 82 |   |   |   |
| 4 | Xylene | 34 | 248 | 7 | 82 |
|   | Toluene | 66 |   |   |   |
| 5 | (Control) |   |   |   | 50 |

EXAMPLE II

Figure 1:
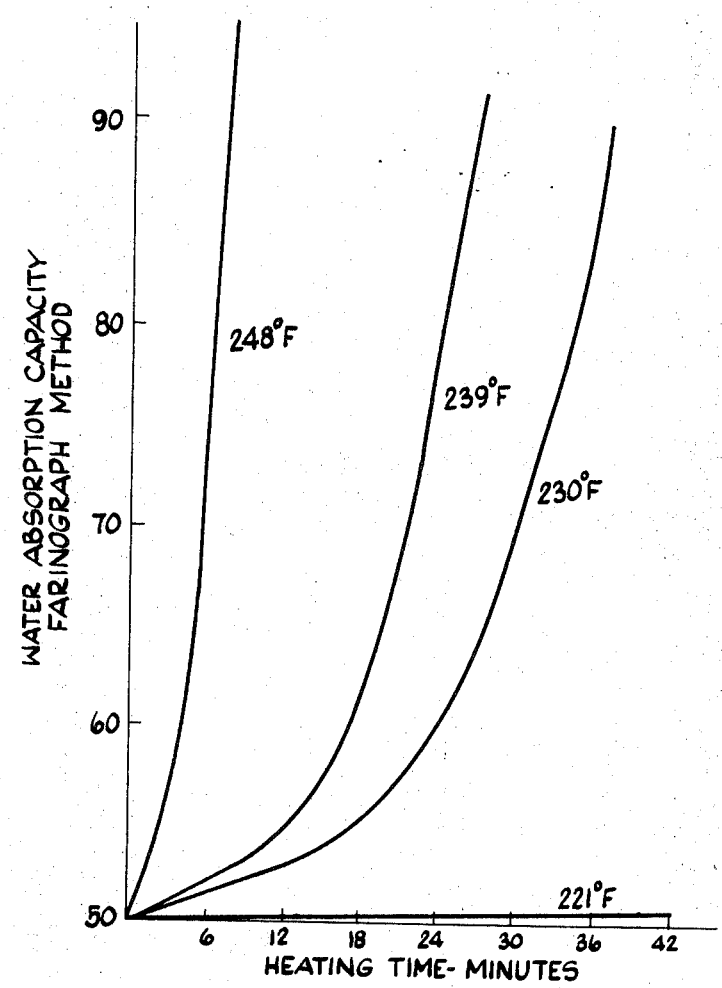
FIG. 1 is a plot showing the relation between treatment under certain conditions and the absorption capacity of skim milk powder.

Other samples of spray dried skim milk powder, having a moisture level of 3.8 percent, were heat treated by the above method. The data obtained was used for plotting the graph of FIG. 1. From this graph it can be seen that at a temperature somewhere below 230° F. the method of treatment of the present invention is ineffective to substantially improve the water absorptive capacity of spray dried skim milk powder having a moisture level of 3.8 percent by weight. It can also be seen that at temperatures above about 260° F. the total potential improvement in the water absorptive capacity is achieved substantially instantaneously. No additional benefit is derived from the use of temperatures above about 260° F. and care must be taken not to scorch the skim milk powder at temperatures above this level. It should be understood, however, that the method of the present invention is intended to encompass those temperatures of treatment that are operable and which are slightly above 260° F., or slightly below 230° F.

EXAMPLE III

Four lots of spray dried skim milk were prepared having moisture levels of 3.8 percent, 8.0 percent, 12.4 percent and 15.9 percent by weight. The higher moisture level lots were prepared by adding the required amount of water to spray dried skim milk powder having a moisture level of 3.8 percent. Each of these lots were then heat treated at temperatures of 225° F., 210° F., 195° F., 180° F. and 165° F. for various times. For the heat treatment step 150 gram samples from the respective lots were sealed into thin walled glass tubes to prevent moisture loss during heat treatment. A thermometer was inserted through an opening in the lid of the tube into the sample and the opening was sealed. The heat treatment was effected by immersing the thin walled tubes containing the sample in a controlled temperature bath maintained at the desired temperature. The time of heat treatment at the various temperatures was measured after the sample reached the bath temperature.

Numerous samples were run at each of the above indicated temperatures for each of different moisture level lots. Farinograph water absorptive capacities were determined for each sample. From the data obtained Table 2 below was prepared. In Table 2 are shown the time required at each of the temperatures for the different moisture level lots to reach a Farinograph water absorption capacity of 65.

TABLE 2

| Temperature, °F. | Moisture Level of Lot-weight Present | | | |
|---|---|---|---|---|
| | 3.8 | 8.0 | 12.4 | 15.9 |
| | Time (hours) required to obtain Farinograph water absorption capacity of 65 | | | |
| 225 | 0.6 | 0.01 | | |
| 210 | 2.3 | 0.04 | | |
| 195 | 8.8 | 0.15 | 0.013 | |
| 180 | 33.0 | 0.55 | 0.048 | 0.013 |
| 165 | 120.0 | 2.0 | 0.18 | 0.048 |

From the above table the plots of FIGS. 3 and 4 were prepared. In FIG. 3 are shown the family of curves which relate the time required to obtain a Farinograph water absorption capacity of 65 to the moisture level of the skim milk powder at specific temperatures of heat treatment.

In FIG. 4 are shown the family of curves which relate time required to obtain Farinograph water absorption capacity of 65 to the temperature of heat treatment for specific moisture levels of skim milk powder.

From an examination of FIG. 4 it can be seen that to attain a water absorption capacity of 65 at a holding time of 1 hour (60 minutes), when the moisture content of the skim milk powder is from about 3.5 percent to about 16 percent, requires holding temperatures of about 125° F. to about 225° F. To attain the same water absorptive capacity for the same range of moisture when the holding time is 0.01 hour (.6 minute) requires holding temperatures of about 180° F. to about 270° F. In general, for practical reasons, it is preferred to attain a water absorptive capacity of at least about 65 at a holding time of from between about 0.6 minute and 60 minutes. As indicated above, this requires holding temperatures of from about 125° F. to about 270° F. However, it is apparent from an examination of FIGS. 1 to 4 and the specification that other time and temperature conditions may be used to attain a water absorptive capacity of 65 or that other water absorptive capacities can be attained at other time and temperature conditions.

It should be understood that other families of curves would be obtained to provide Farinograph water absorptive capacities other than 65 or with milk powders other than skim milk powder.

EXAMPLE IV

Samples of spray dried skim milk powder having 3.8 percent moisture were heat treated by pneumatically conveying the powder through a tunnel. During passage through the tunnel the powder was contacted with a stream of hot air that was heated to temperatures of from between 380° F. and 490° F. Passage of the powder through the tunnel was affected in a time less than 30 seconds, i.e., substantially instantaneously. The temperature that the powder reached in passage through the tunnel was from between 240° F. and 265° F.

Figure 2:
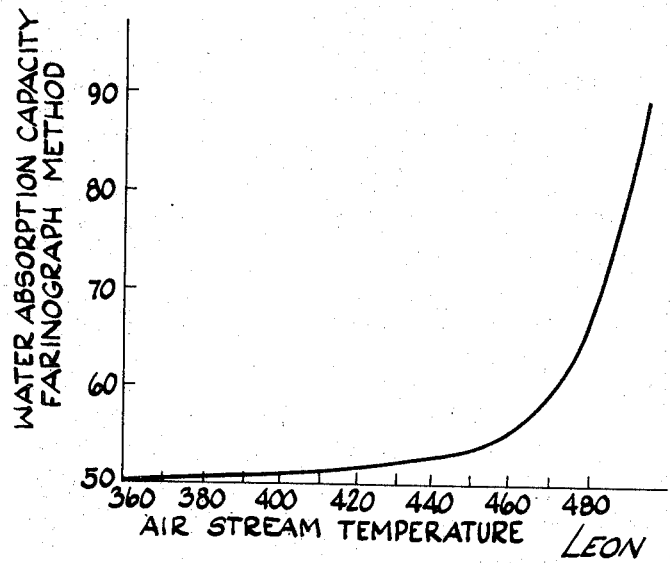
FIG. 2 is a plot showing the relationship of water absorption capacity of skim milk powder to other conditions of treatment.

The water absorption capacity of various samples of skim milk powder which had been heat treated in the above manner was determined by the Farinograph method, as previously described, and this data was used to prepare the plot of FIG. 2 which relates the temperature of hot air stream for an exposure time of the powder of less than 30 seconds to water absorption capacity.

As can be seen from FIG. 2 exposure of the skim milk powder to dry heat at temperatures of from 360° F. to 490° F. for an exposure time of less than 30 seconds results in gradual increase of the water absorption capacity of the skim milk powder as the temperature is increased. It would, of course, be readily apparent to one skilled in the art to use other exposure times and other temperatures of contact to achieve equivalent results.

EXAMPLE V

Skim milk powder which had been treated by the method of Example IV to provide a Farinograph water absorptive capacity of 73 was extracted with water to further increase the water absorption capacity. Thirty-five pounds of the skim milk powder, having 37 weight percent protein and 3.8 weight percent moisture, was added to 415 pounds of water. The mixture was stirred for five minutes and the dispersion was then centrifuged to recover the insoluble solids.

The insoluble solids were removed from the centrifuge bowl, spread into layers and tray dried. Sixteen pounds of dry material were recovered having protein level of 75 weight percent. When this dry material was subjected to Farinograph analysis, at a ratio of 150 grams of dry material to 150 grams of flour, its water absorption capacity was too high to measure. The dry material was then blended with non-extracted skim milk having a Farinograph water absorption capacity of 77 at ratios of 1:3 and 1:1. By extrapolation, the effective water absorption capacity of extracted dry material recovered from the extraction process was 165.

It is to be understood that the invention is not to be limited to the exact details of the operation or the exact processes and compositions shown or described, as obvious modifications will be apparent to those skilled in the art and the invention is intended to be limited only by the scope of the appended claims.

It is claimed that:

1. A method for providing a milk powder with improved water absorption capacity which comprises providing milk powder with a preselected moisture of from about 20 percent to about 3 percent by weight and uniformly heating said milk powder to a predetermined temperature for a period of time such that the water absorptivity of the milk powder is increased to a Farinograph water absorption capacity of at least about 65, said temperature and time conditions being at least equivalent to the temperature and time conditions for a particular moisture level as established by FIG. 4.

2. The method of claim 1 wherein said milk powder is spray dried skim milk powder.

3. The method of claim 1 wherein said heating is effected by contacting said milk powder with a heated gas, while said milk powder is maintained in a fluidized state.

4. The method of claim 1 wherein said heating is effected without substantially reducing the moisture level of said milk powder.

References Cited

UNITED STATES PATENTS 3,410,701 11/1968 Ciboit _____ 99—56 X

OTHER REFERENCES

Hall et al. Drying Milk and Milk Products. The Avi Publishing Co. Inc. Westport, Conn. 1966 (pp. 112–113, and 152–155).

LIONEL M. SHAPIRO, Primary Examiner

D. M. NAFF, Assistant Examiner

U.S. Cl. X.R.

99—203